(12) United States Patent
Pincemin

(10) Patent No.: US 7,577,363 B2
(45) Date of Patent: Aug. 18, 2009

(54) OPTICAL DEVICE AND METHOD OF CONVERTING WDM SIGNALS INTO AN OTDM SIGNAL AND VICE VERSA

(76) Inventor: Erwan Pincemin, Kernevez, Gommenec'h (FR) F-22290

( * ) Notice: Subject to any disclaimer, the term of this patent is extended or adjusted under 35 U.S.C. 154(b) by 364 days.

(21) Appl. No.: 10/511,227

(22) PCT Filed: Mar. 13, 2003

(86) PCT No.: PCT/FR03/00810

§ 371 (c)(1),
(2), (4) Date: May 24, 2005

(87) PCT Pub. No.: WO03/090392

PCT Pub. Date: Oct. 30, 2003

(65) Prior Publication Data

US 2005/0226623 A1    Oct. 13, 2005

(30) Foreign Application Priority Data

Apr. 19, 2002 (FR) ................... 02 04968

(51) Int. Cl.
*H04J 4/00* (2006.01)
*H04J 14/00* (2006.01)
*H04J 14/08* (2006.01)

(52) U.S. Cl. .............. 398/75; 398/79; 398/80; 398/98; 398/101; 398/102; 398/178; 398/179

(58) Field of Classification Search .......... 398/43, 398/47, 74, 75, 79, 80, 98, 186, 191, 201; 359/1, 245, 326

See application file for complete search history.

(56) References Cited

U.S. PATENT DOCUMENTS 5,726,789 A  *  3/1998  Horiuchi et al. ............. 398/191

(Continued)

FOREIGN PATENT DOCUMENTS

EP    1 137 213 A    9/2001

OTHER PUBLICATIONS

Hatami-Hanza et al: "Demonstration of All-Optical Demultiplexing of a Multilevel Soliton Signal Employing Soliton Decomposition and Self-Frequency Shift", IEEE Phtonics Technology Letters, vol. 9, No. 6, Jul. 1997, pp. 833-835.*

(Continued)

*Primary Examiner*—Ken N Vanderpuye
*Assistant Examiner*—Li Liu
(74) *Attorney, Agent, or Firm*—McDonnell Boehnen Hulbert & Berghoff LLP

(57) ABSTRACT

A device and a method for converting WDM signals into an OTDM signal. A time shift is introduced between the pulses of the WDM signals carried by the optical carriers. A modulation means is (112, 113, 114) adapted to modify the optical power of the WDM signals, and an optical temporal multiplexer/ demultiplexer (120) is provided. The WDM signals are injected into a birefringent propagation medium (130) in such a manner as to achieve a soliton trapping phenomenon. An absorption means (140) is adapted to introduce optical losses into the components of the OTDM signal. This technique performs WDM/OTDM conversion at very high bit rates. It also performs OTDM/WDM conversion. It is intended to be installed in long-haul telecommunication networks.

16 Claims, 4 Drawing Sheets

U.S. PATENT DOCUMENTS

| | | | |
|---|---|---|---|
| 5,889,607 A * | 3/1999 | Suzuki et al. | 359/245 |
| 6,307,658 B1 | 10/2001 | Chiaroni et al. | |
| 6,614,583 B1 * | 9/2003 | Wachsman | 359/326 |
| 2002/0126346 A1 * | 9/2002 | Suzuki et al. | 359/123 |
| 2003/0058490 A1 * | 3/2003 | Brotherton-Ratcliffe et al. | 359/1 |
| 2003/0058500 A1 * | 3/2003 | Sugawara | 359/135 |

OTHER PUBLICATIONS

Islam et al: "Soliton Trapping in Birefringent Optical Fibers", Optics Letters, Sep. 15, 1989, pp. 1011-1013.*

Olsson et al: "WDM to OTDM Multiplexing Using an Ultrafast All-Optical Wavelength Coverter", IEEE Photonics Technology Letters, vol. 13, No. 9, Sep. 2001, pp. 1005-1007.*

C.R. Menyuk, "Stability of solitons in birefringent optical fibers", Optics Letters, vol. 12, No. 8, (1987) pp. 614-616.

M.N. Islam et al., "Soliton trapping in birefringent optical fibers", Optics Letters, vol. 14, No. 18, (1989) pp. 1011-1013.

M.N. Islam, "Ultrafast all-optical logic gates based on soliton trapping in fibers", Optics Letters, vol. 14, No. 22, (1989), pp. 1257-1259.

H. Hatami-Hanza et al., "Demonstration of All-Optical Demultiplexing of a Multilevel Soliton Signal Employing Soliton Decomposition and Self-Frequency Shift", IEEE Photonics Technology Letters, vol. 9, No. 6, pp. 1041-1135, Jun. 1997.

* cited by examiner

OPTICAL DEVICE AND METHOD OF CONVERTING WDM SIGNALS INTO AN OTDM SIGNAL AND VICE VERSA

RELATED APPLICATION

This is a U.S. National Phase Application under 35 USC 371 of International Application PCT/FR03/00810, filed Mar. 13, 2003.

FIELD OF THE INVENTION

The present invention relates to an optical device and a method for converting WDM (wavelength division multiplex) signals comprising simultaneous pulses carried by different wavelengths into an OTDM (optical time division multiplexing/demultiplexing) signal whose components are time shifted and carried by a single wavelength, and vice-versa.

BACKGROUND OF THE INVENTION

The field of the invention is that of optical telecommunications and more particularly that of long-haul telecommunications. In the present situation of ever increasing bit rates on long-haul transmission networks, increasing the transmission channel bit rate is inevitable, because it reduces the overall size, and more importantly the cost, of the terminal equipment. Accordingly, the next few years should see the deployment on the transport networks of telecommunication operators of the first wavelength division multiplexing (WDM) plant operating at 40 Gbit/s per wavelength and, in the longer term, at 160 Gbit/s per wavelength. This being the case, the requirements of transport networks in terms of optical time division multiplexing/demultiplexing (OTDM) will also increase. This being so, it is particularly beneficial to provide an all-optical WDM/OTDM conversion function, in order to be able to transfer the information conveyed by a plurality of wavelengths to a single carrier, and an all-optical OTDM/WDM conversion function, in order to be able to transfer to a plurality of optical carriers the information contained in an optical channel operating at a very high bit rate, typically at 40 Gbit/s, 160 Gbit/s or 640 Gbit/s. In the latter case, the number of optical carriers involved in the conversion process is equal to the number of OTDM components of the optical signal to be converted. These OTDM components may have a bit rate of 40 Gbit/s or 10 Gbit/s.

Solutions for providing this kind of WDM/OTDM and OTDM/WDM conversion exist already, and include all-electronic solutions that use opto-electronic transponders equipped with photo receivers or laser diodes to effect optical/electronic and electronic/optical conversion. Electronic components then handle time division multiplexing/demultiplexing. Those solutions are complex to implement, however, because they require two-fold optical/electronic and/or electronic/optical conversions and use a large number of components, which makes them difficult to install in the network because of obvious overall size problems. They are also limited in terms of electrical bandwidth. The major drawback of those solutions is that their bit rate is limited because the electronics used are not able to operate at bit rates of 40 Gbit/s and above.

There also exist all-optical solutions in which OTDM/WDM conversion consists in optical time division demultiplexing followed by wavelength conversion. Optical time division demultiplexing uses crossed phase modulation in a fiber, for example. That technology is very complex to implement, however. The optical time division demultiplexing may also be effected by means of non-linear optical mirrors using Mach-Zehnder, Michelson, or Sagnac interferometers. However, non-linear optical mirrors have the drawback of being unstable; their stability is in fact temperature-dependent. Wavelength conversion is effected by semiconductor optical amplifiers (SOA). A laser behind the SOA supplies the wavelength to which the signal must be converted. However, that solution uses a number of SOA and lasers equal to the number of wavelength conversions to be effected, with the result that the cost of that solution is very high, which rules out large-scale deployment in networks that are currently in full expansion. Moreover, SOAs are not completely bit rate transparent and distortion affecting the signal may occur.

WDM/OTDM conversion consists in converting the wavelength of each WDM signal to a single wavelength and then carrying out optical time division multiplexing. Wavelength conversion again necessitates the use of a number of SOA and lasers equal to the number of WDM signals, with the result that the cost of that solution is very high.

Finally, although the solutions described above for the two types of conversion (OTDM/WDM and WDM/OTDM) have the advantage of being all-optical solutions, which simplifies the signal processing system, they are able to operate only at low bit rates, below 40 Gbit/s.

Because of their limitations, the existing solutions cannot be used for WDM/OTDM or OTDM/WDM signal conversion at very high bit rates, that is to say bit rates above 40 Gbit/s.

SUMMARY OF THE INVENTION

One object of the present invention is to provide an optical device for converting WDM signals, the pulses of which are simultaneous and carried by different wavelengths, into an OTDM signal, the components of which are time shifted and carried by the same wavelength, and enabling operation at very high bit rates, and thus enabling implementation in long-haul optical transmission networks operating at very high bit rates, typically of 40 Gbit/s and above.

This and other objects are attained in accordance with one aspect of the invention directed to such an optical device which comprises shifting means adapted to introduce a time shift between the pulses of the WDM signals carried by the optical carriers, modulation means adapted to modify the optical power of the WDM signals, an optical spectral and temporal multiplexer/demultiplexer, a birefringent propagation medium into which the WDM signals are injected in such a manner as to achieve a soliton trapping phenomenon, and absorption means adapted to introduce optical losses into the components of the OTDM signal.

Thus the device of the invention uses the well-known phenomenon of soliton trapping in a birefringent propagation medium, which shifts the optical frequency of the carrier in proportion to the optical power of a signal. By adjusting the optical power of the pulses of a signal beforehand, soliton trapping shifts the wavelength of these pulses toward a "target" wavelength of the optical carrier that is to carry the information.

Another aspect of the invention is directed to a method of converting WDM signals, the pulses of which are simultaneous and carried by different wavelengths, into an OTDM signal, the components of which are time shifted and carried by the same wavelength, by means of said device. This method is noteworthy in that it comprises the steps of time shifting the pulses of the WDM signals carried by the optical carriers, attenuating the WDM signals in order for them to have different optical powers, spectrally and temporally multiplexing the WDM signals, injecting the wavelength division multiplex obtained into the birefringent propagation medium in such a manner as to achieve a soliton trapping phenomenon and obtain an OTDM signal, and equalizing the optical power of the components of the OTDM signal obtained.

Another aspect of the present invention is directed to an optical device able to carry out the opposite conversion, i.e. able to convert an OTDM signal, the components of which are time shifted (t1, t2, t3, t4) and carried by the same wavelength (λ4), into WDM signals, the pulses of which are carried by different wavelengths (λ1, λ2, λ3, λ4), and enabling operation at very high bit rates and implementation in long-haul optical transmission networks. The device comprises absorption means adapted to introduce optical losses into the components of the OTDM signal, a birefringent propagation medium into which the OTDM signal is injected in such a manner as to achieve a soliton trapping phenomenon, an optical spectral and temporal multiplexer/demultiplexer, and modulation means adapted to modify the optical power of the WDM signals.

Another aspect of the present invention is directed to a method of converting an OTDM signal, the components of which are time shifted relative to each other and carried by the same wavelength into WDM signals, the pulses of which are carried by different wavelengths, by means of said device. This method comprises attenuating the components of the OTDM signal in such a manner that they have different optical powers, injecting the OTDM signal into the birefringent propagation medium in such a manner as to achieve a soliton trapping phenomenon and recover a wavelength division multiplex, spectrally and temporally demultiplexing the wavelength division multiplex in such a manner as to obtain a plurality of WDM signals whose pulses are time shifted and carried by different wavelengths, and equalizing the optical power of the pulses of the WDM signals obtained.

BRIEF DESCRIPTION OF THE DRAWINGS

Other features and advantages of the invention will become apparent on reading the following description, which is given by way of illustrative and non-limiting example and with reference to the appended drawings, in which.

DETAILED DESCRIPTION OF THE DRAWINGS

By way of example, the remainder of the description refers to converting four 40 Gbit/s WDM signals carried by four channels at different wavelengths into a 160 Gbit/s OTDM signal carried by a single channel on a single optical carrier, and vice-versa.

The invention may of course be applied to signals having any bit rate. It is preferably applied to signals having bit rates of 40 Gbit/s, 160 Gbit/s or even 640 Gbit/s.

The WDM/OTDM and OTDM/WDM conversion device is adapted to process signals comprising RZ (return to zero) data which may be of the soliton type or a different type. An RZ signal is a digital signal comprising 0 and 1 states, bits at 1 corresponding to pulses and bits at 0 corresponding to the absence of any pulse in the bit period.

Figure 1:
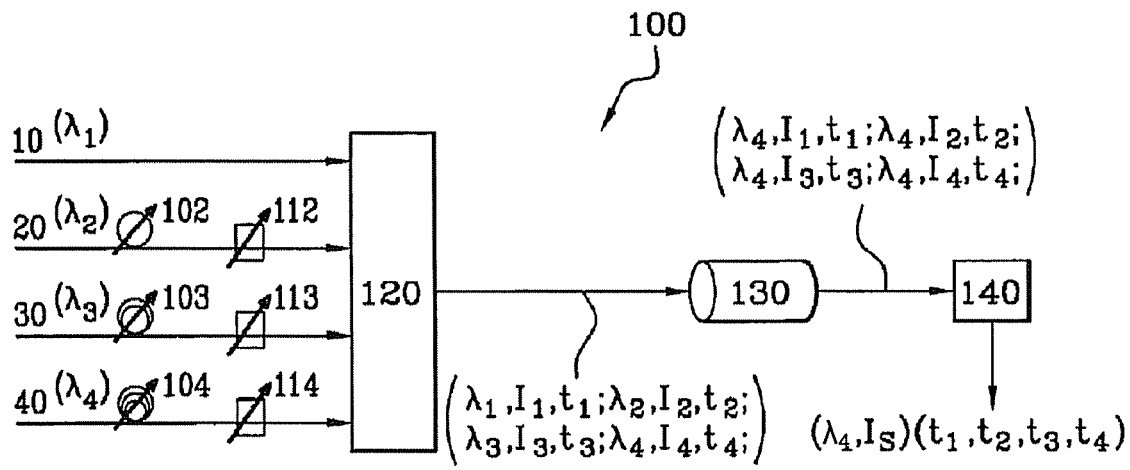
FIG. 1 shows a device of the invention used as a WDM/OTDM converter.

The device 100 in FIG. 1 is used as a WDM/OTDM converter. In this example, it is adapted to convert four 40 Gbit/s WDM signals carried by four channels 10, 20, 30, 40 at different wavelengths λ1, λ2, λ3, λ4, for example, into a 160 Gbit/s OTDM signal carried by a single channel on a single optical carrier at the wavelength λ4.

There are shifting means 102, 103, 104 and modulation means 112, 113, 114 at the output of the four WDM channels. The shifting means, consisting of delay lines, for example, introduce a time shift between the pulses of the WDM signals carried by the optical carriers. This phase shift between the pulses is necessary for subsequent time division multiplexing of the signals.

In this example, only three channels 20, 30, 40 are provided with these delay lines, since it is sufficient for each carrier to have a different shift to the others. There is therefore no need to introduce a time-delay on the first channel 10, although there is nothing to rule this out either, of course.

The delay lines 102, 103, 104 may be fixed and designed to shift each optical carrier by a fixed time period for each signal. It is nevertheless preferable to use variable delay lines in order to be able to adjust and refine the shifts.

The optical modulation means 112, 113, 114 modulate the optical power of the WDM signals and comprise variable attenuators, for example. Accordingly, to attenuate them, different optical losses are induced in each of the WDM signals, for example. There are then obtained WDM signals carried by different wavelengths λ1, λ2, λ3, λ4 at different optical powers I1, I2, I3, I4 that are adjusted to achieve the soliton trapping effect required subsequently.

In this example, only three channels 20, 30, 40 are provided with these attenuators, but each channel may be provided with an attenuator, for the same reasons given for the delay lines. Variable optical attenuators are preferably used to adjust the power of each WDM signal.

In this example, the delay lines 102, 103, 104 precede the optical attenuators 112, 113, 114, but in reality their order is of no importance at this stage. It is sufficient if the WDM signals at the input of the optical multiplexer/demultiplexer 120 have been shifted and modulated.

The optical spectral and time division multiplexer/demultiplexer 120 then multiplexes the WDM signals so that there is only one wavelength division multiplex comprising time shifted (t1, t2, t3, t4) pulses at different wavelengths λ1, λ2, λ3, λ4 and different powers I1, I2, I3, I4.

The multiplex obtained in this way is then injected into birefringent propagation means 130, for example a birefringent optical fiber, to produce the soliton trapping phenomenon and obtain a time division multiplex signal constituting an OTDM signal carried by a single wavelength, the wavelength λ4 in this example.

Absorption means 140 then equalize the optical powers of the components of the final OTDM signal.

FIGS. 2 to 5, being more detailed, enable the operation of this device during WDM/OTDM conversion to be explained more clearly.

Figure 2:
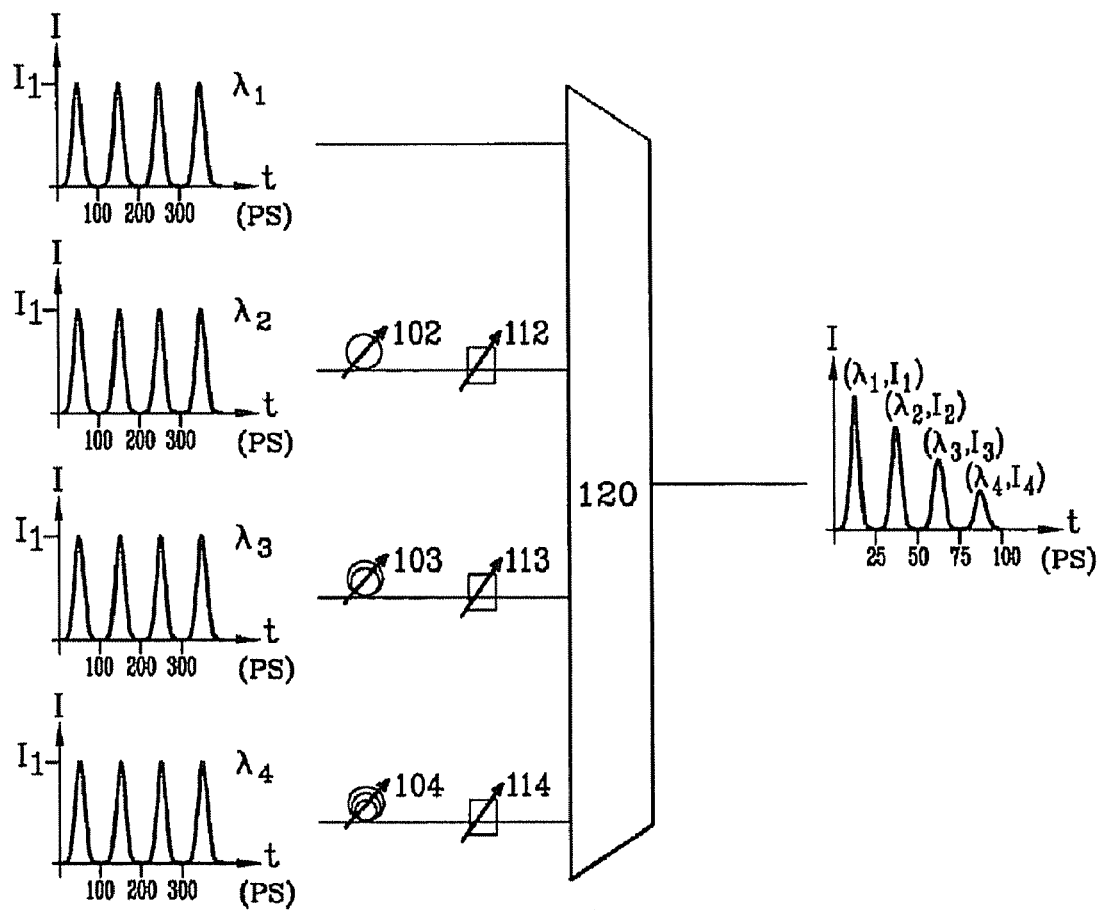
FIG. 2 shows WDM signals at the input of the FIG. 1 device and at the output of the spectral and temporal multiplexer.

FIG. 2 shows the timing diagram of each WDM signal at the input of the device and that of the wavelength division multiplex at the output of the optical spectral and time division multiplexer/demultiplexer 120. At the input of the device, each WDM signal comprises pulses carried by a different wavelength λ1, λ2, λ3, λ4. The pulses of the various WDM signals all have the same intensity I1 and occur simultaneously.

At the output of the multiplexer 120, the multiplex comprises time shifted (t1, t2, t3, t4) pulses at different wavelengths λ1, λ2, λ3, λ4 and different intensity I1, I2, I3, I4. As shown in FIG. 2, each 100 ps pulse is compressed so that at the output of the multiplexer, the pulses are only 25 ps such that the four output pulses have total temporal width of 100 ps.

The pulses of the OTDM signal to be obtained at the output of the device must be interleaved. The shift between two pulses must therefore be identical each time. Accordingly, at 160 Gbit/s, for example, the pulses are shifted relative to each other by 6.25 ps. The shift between the pulses is therefore set and adjusted beforehand by means of the delay lines 102, 103, 104.

Figure 3:
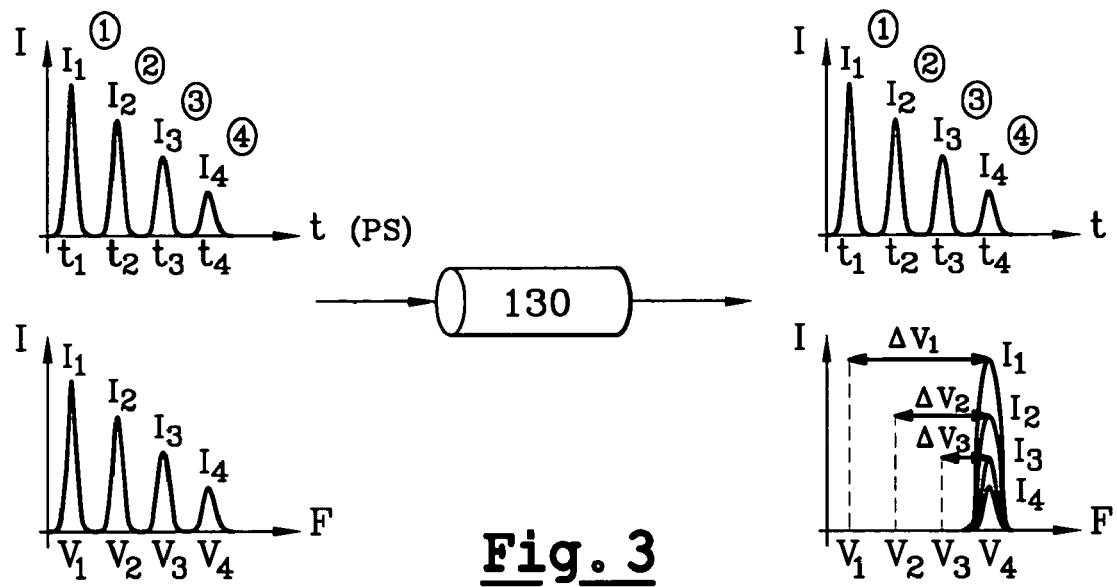
FIG. 3 shows signals at the input and at the output of the birefringent propagation medium of the FIG. 1 device.

The optical power I1, I2, I3, I4 of each pulse of the wavelength division multiplex is adjusted beforehand by means of variable attenuators 112, 113, 114 to exacerbate non-linear effects in the birefringent optical fiber 130 and thereby encourage the required soliton trapping effect, as shown in FIG. 3.

A birefringent propagation medium comprises two main propagation axes. To encourage the soliton trapping phenomenon, the multiplex is injected with a polarization at 45° to the main propagation axes of the birefringent medium 130. In this case, a polarization controller may precede the optical fiber 130, for example, to convert any incoming polarization to another polarization and in particular a linear polarization at 45° to the main axes of the birefringent fiber.

A soliton is a light pulse that is sufficiently intense to excite a non-linear effect that compensates the effects of chromatic dispersion over long distances. Under some conditions, in particular conditions of power and chromatic dispersion well known to the person skilled in the art, the injected pulses 1 to 4 retain their integrity and are not temporally deformed. Their frequency spectrum is deformed, however, and a frequency shift relative to the original frequency of the spectrum of each of these pulses occurs on entering the propagation medium. This phenomenon, during the course of which the pulse is not temporally deformed but the spectrum suffers a frequency shift, is known as soliton trapping. The frequency shift $\Delta \upsilon I$ is proportional to the luminous power Ii of the pulse i injected into the propagation medium.

Accordingly, by precisely adjusting the luminous power Ii of each pulse i of the wavelength division multiplex, the frequency shift $\Delta \upsilon I$ induced by the soliton trapping phenomenon in the pulse i of the wavelength division multiplex may be adjusted to achieve perfect spectral matching of the spectrum shifts of the WDM channels. This precise adjustment is obtained by means of the variable delay lines and the variable attenuators preceding the multiplexer 120. In the FIG. 3 example, the pulses 1, 2, 3 with respective intensities I1, I2, I3 are subjected to shifts $\Delta \upsilon 1$, $\Delta \upsilon 2$, $\Delta \upsilon 3$ so that their wavelengths all coincide with the wavelength λ4 of the fourth pulse.

An OTDM signal is therefore obtained at the exit from the birefringent medium whose components are time shifted (t1, t2, t3, t4) and carried by a single wavelength λ4.

However, the components of the OTDM signal obtained do not have the same luminous power I1, I2, I3, I4. Absorption means 140 are therefore provided to return all the components of the OTDM signal to the same optical power level.

Figure 4:
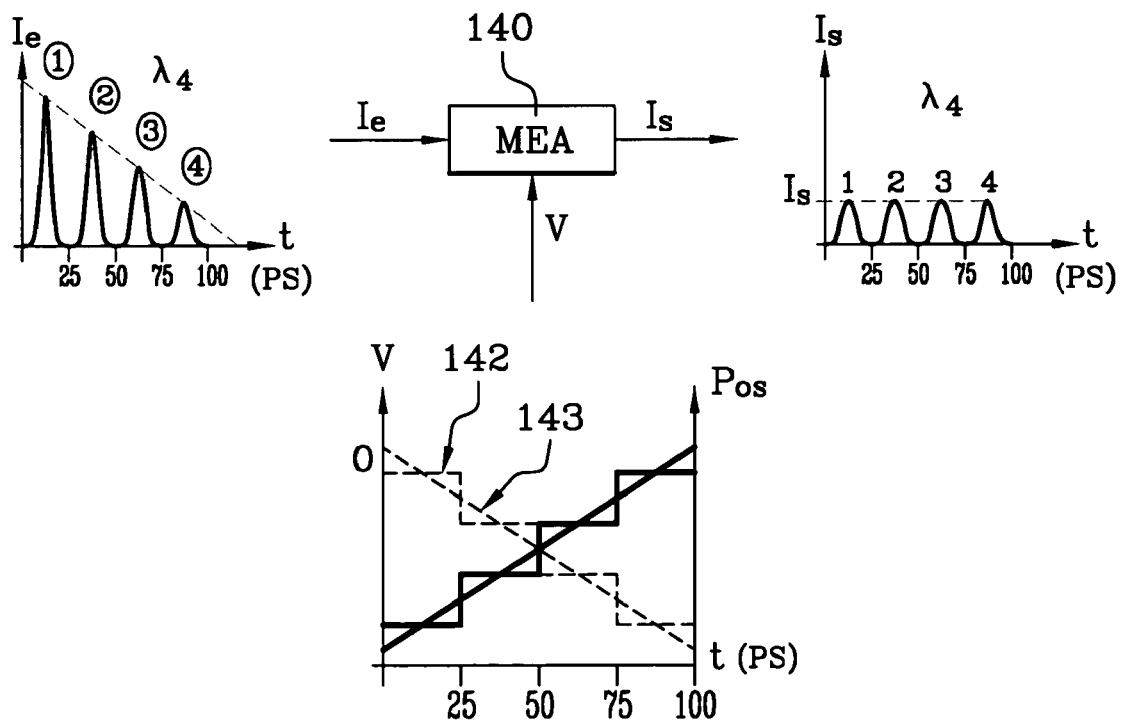
FIG. 4 shows absorption means used in the FIG. 1 device and signals at the input and the output of the absorption means.

This power equalization uses an electro-absorption modulator MEA, for example, that applies selective optical losses to the components of the OTDM channel, as shown in FIG. 4. The losses Pos may have a stepped time profile (142) or a linear ramp time profile (143), as shown by the curves of the applied voltage V and the output optical losses Pos as a function of time t. The continuous line curve relates to the applied voltage V and the dashed line curve relates to the output optical losses Pos.

Accordingly, the absorption of the MEA being a function of the applied voltage V and time, the components of the injected signal are not subject to the same absorption on entering the MEA because each has a different intensity and they are time shifted relative to each other. The components 1, 2, 3, 4 then have exactly the same optical power Is at the output of the MEA.

Figure 5:
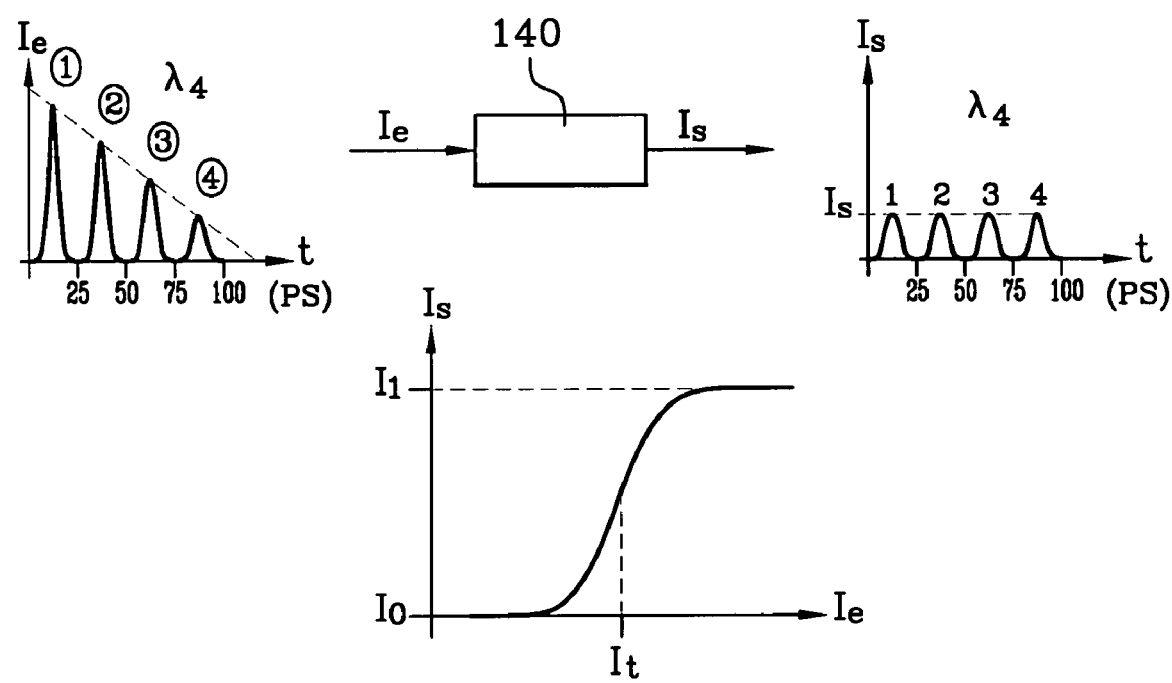
FIG. 5 shows different absorption means used in a different embodiment of the FIG. 1 device and signals at the input and output of those absorption means.

A different embodiment uses a saturable absorber to effect this power equalization, as shown in FIG. 5. The transfer function of a saturable absorber comprises two different states, namely a blocking state when the input power Ie is below a threshold power It and a totally transparent state when the input power is above that threshold power. In the transparent state, the output signal of the saturable absorber has a constant output power Is. If the components of the OTDM signal obtained all have powers I1, I2, I3, I4 above the threshold power It, they all have the same output power Is at the output of the absorber. If, however, the components of the OTDM signal have a power below the threshold power, they are totally absorbed.

Figure 6:
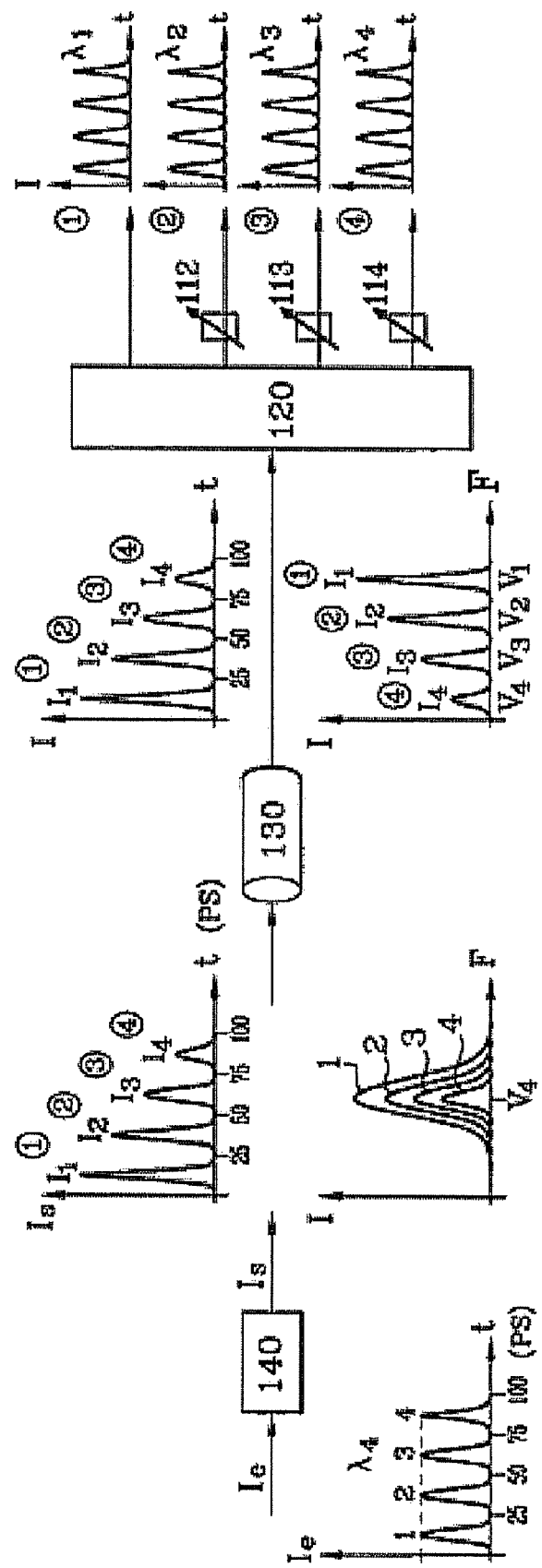
FIG. 6 shows a device of the invention used as an OTDM/WDM converter and signals at each stage of conversion.

The device 100 may also be used to carry out the opposite conversion, i.e. to convert an OTDM signal into WDM signals. This conversion uses the same device in the opposite direction. It is therefore described more succinctly, and with reference to FIG. 6, which shows the device used as an OTDM/WDM converter and the signals at each stage of the conversion.

The OTDM signal is initially passed through absorption means 140 in order for selective optical losses to be applied to its components. The absorption means comprise the electro-absorbent modulator MEA described above, for example. The components of the OTDM signal do not suffer the same absorption and therefore suffer different optical losses.

The OTDM signal obtained is then injected into the birefringent optical fiber 130 to achieve the soliton trapping effect described above. In this case, the components of the OTDM spectrum are subjected to a frequency shift $\Delta \upsilon I$ proportional to their optical power. A wavelength division multiplex is therefore obtained whose pulses 1, 2, 3, 4 are time shifted relative to each other and carried by different wavelengths λ1, λ2, λ3, λ4 and have different optical powers I1, I2, I3, I4.

Just as for WDM/OTDM conversion, a polarization controller may precede the optical fiber 130, for example, to facilitate injection of the signal with a polarization at 45° to the main axes of the optical fiber.

The next step is to pass the wavelength division multiplex through the multiplexer/demultiplexer 120 in order to demultiplex it spectrally and temporally and to obtain four signals at different wavelengths λ1, λ2, λ3, λ4.

The final step is to equalize the optical powers of the pulses of the WDM signals. This is effected by the modulation means 112, 113, 114, which comprise variable attenuators as described above, for example.

It is not essential to use the FIG. 1 shifting means 102 to 104 for the OTDM/WDM conversion. If those means, for example delay lines, are used, they time shift the pulses carried by the optical carriers of the WDM signals in such a manner as to render them simultaneous.

The device that has just been described is no more than an illustration of the invention, which is in no way limited to this example and has applications in high bit rate long-haul optical telecommunications.

The device has the advantage of being all optical and is easy to implement and to install in the network. It uses no laser sources, only low-cost components, and is independent of bandwidth. Finally, the device is of very great benefit for the incoming generations of high bit rate transmission systems operating at bit rates of 40 Gbit/s and above.

The invention claimed is:

1. An optical device comprising:
a time-shifting means for inducing time shifts into one or more input signals, wherein the one or more input signals have different optical carrier frequencies;
a modulation means for modulating optical power of the one or more input signals, wherein the modulated time-shifted signals have different optical power levels;
a multiplexing means for multiplexing the modulated time-shifted signals;
a birefringent propagation medium for producing an optical time division multiplexing (OTDM) signal carried by a single wavelength by applying a soliton trapping to induce frequency shifts into the multiplexed modulated time-shifted signal, wherein an amount of the frequency shift introduced to each component of the multiplexed modulated time-shifted signals is in correspondence with the optical power level of that component; and
an absorption means for adjusting the optical power of each component of the OTDM signal so that all components have substantially similar optical power levels.

2. The device of claim 1, wherein the shifting means comprises variable delay lines.

3. The device of claim 1, wherein the modulation means comprises variable attenuators.

4. The device of claim 1, further comprising:
a polarization controller at an entry of the birefringent propagation medium for converting a polarization of the power adjusted components of the input signal to 45° to main axes of the birefringent propagation medium.

5. The device of claim 1, wherein the absorption means comprises an electro-absorption modulator.

6. The device of claim 1, wherein the absorption means comprises a saturable absorber.

7. An optical device comprising:
an absorption means for adjusting optical power levels of individual components of an input signal, wherein the components of the input signal are optical time division multiplexed (OTDM) and have a same optical carrier frequency, and wherein the adjusted components have different optical power levels;
a birefringent propagation medium for applying a soliton trapping to induce frequency shifts into the power adjusted components of the input signal so that each component has a different optical carrier frequency, wherein the account of frequency shift induced to each component is in correspondence with the optical power level of that component;
an optical demultiplexing means for demultiplexing the frequency shifted signal components; and
a modulation means for modulating the optical power levels of the demultiplexed frequency shifted signal components so that all signal components have substantial similar optical power levels.

8. The device of claim 7, further comprising:
a shifting means for inducing time shifts into the demultiplexed frequency shifted signal components to reduce relative time delays.

9. A method comprising:
receiving a plurality of optical signal components, wherein the plurality of optical signal components have different optical carrier wavelengths;
time shifting at least one of the pulses of the plurality of optical signal components;
modulating optical power levels of the at least one of the time shifted pulses of the plurality of optical signal components;
generating a multiplexed optical signal from the plurality of optical signal components, wherein each component of the multiplexed optical signal has a different optical power level, a different time delay, and a different carrier wavelength;
frequency shifting the components of the multiplexed signal by a soliton trapping to a single optical carrier wavelength using a birefringent propagation medium to form an optical time division multiplexed (OTDM) signal at the single optical carrier wavelength, wherein an amount of the frequency shift induced to each signal component is in correspondence with the optical power level of that signal component; and
equalizing the components of the OTDM signal so that all components of the OTDM signal have substantially similar optical power levels.

10. The device of claim 9, wherein the pulses of the plurality of optical signal components are shifted in time by at least one variable delay line.

11. The device of claim 9, wherein the optical power levels of the time shifted pulses are adjusted by at least one variable attenuator.

12. The device of claim 9, wherein frequency shifting the components of the multiplexed signal to a single optical carrier wavelength using a birefringent propagation medium further comprises converting a polarization of the multiplexed signal to 45° to main axes of the birefringent propagation medium to facilitate the frequency shifting.

13. The device of claim 9, wherein the components of the OTDM signal are equalized by an absorption means comprising an electro-absorption modulator.

14. The device of claim 9, wherein the components of the OTDM signal are equalized by an absorption means comprising a saturable absorber.

15. A method comprising:
adjusting optical power levels of one or more signal components of an optical time division multiplexed (OTDM) signal carried by a single wavelength such that the one or more signal components have different optical power levels;
frequency shifting the power adjusted signal components using a birefringent propagation medium by a soliton trapping to different optical carrier wavelength, wherein an amount of the frequency shift imparted to each signal component is in correspondence with the power level of that signal component;
demultiplexing the frequency shifted power adjusted signal components to obtain one or more single wavelength signals; and
equalizing the optical power of the one or more single wavelength signals so that the one or more single wavelength signals have substantially similar optical power levels.

16. The method of claim 15, further comprising:
removing relative time delays among the one or more single wavelength signals by time shifting the one or more single wavelength signals.

* * * * *

UNITED STATES PATENT AND TRADEMARK OFFICE
CERTIFICATE OF CORRECTION

PATENT NO. : 7,577,363 B2  Page 1 of 1
APPLICATION NO. : 10/511227
DATED : August 18, 2009
INVENTOR(S) : Erwan Pincemin It is certified that error appears in the above-identified patent and that said Letters Patent is hereby corrected as shown below:

Title page, item (*) Notice: should read as follows:   Subject to any disclaimer, the term of this patent is extended or adjusted under 35 U.S.C. 154(b) by 746 days.

Claim 7, column 7, line 54, delete "account" and replace with --amount--.

Claim 10, column 8, line 26, delete "device" and replace with --method--.

Claim 11, column 8, line 29, delete "device" and replace with --method--.

Claim 12, column 8, line 32, delete "device" and replace with --method--.

Claim 13, column 8, line 38, delete "device" and replace with --method--.

Claim 14, column 8, line 41, delete "device" and replace with --method--.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,577,363 B2 |
| APPLICATION NO. | : 10/511227 |
| DATED | : August 18, 2009 |
| INVENTOR(S) | : Erwan Pincemin |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Seventh Day of September, 2010

David J. Kappos
*Director of the United States Patent and Trademark Office*